UNITED STATES PATENT OFFICE.

RUDOLF HAUGWITZ, OF FRIEDRICHSHAGEN, NEAR BERLIN, GERMANY, ASSIGNOR TO ACTIEN GESELLSCHAFT FUR ANILIN FABRIKATION, OF BERLIN, GERMANY.

ORTHOOXYAZO DYES.

1,419,500.   Specification of Letters Patent.   Patented June 13, 1922.

No Drawing.   Application filed August 30, 1921.   Serial No. 496,967.

*To all whom it may concern:*

Be it known that I, RUDOLF HAUGWITZ, a citizen of the German Republic, residing at Friedrichshagen, near Berlin, Germany, my post-office address being Seestr. 97, Friedrichshagen, near Berlin, Germany, have invented certain new and useful Improvements in Orthooxyazo Dyes, of which the following is a specification.

The object of my invention is new orthooxyazo-dyes derived from an oxydiazo-compound and a mono oxy-derivative of quinoline. The manufacture is carried on in the known manner by coupling the components in an alkaline menstruum. The dyes thus prepared are, in the dry state, dark powders soluble in water to a red solution, insoluble in alcohol, ether, benzene and pyridine. They dye wool from an aqueous solution orange to brownish tints becoming fast to washing and milling when treated with chromic acid or chromates, bordeaux to violet brown lakes being formed.

In order to illustrate my invention without limiting it I give the following examples, the parts being by weight:

1. The diazonium compound of 18.9 parts of 2-amino-1-oxybenzene-4-sulfonic acid obtained in the known manner is united with an alkaline solution of 14.5 parts of 8-oxyquinoline. After combination the dye is salted out and finished in the usual manner. It dyes wool brown tints. After treatment with potassium bichromate a bordeaux is obtained which has a very good fastness to light and to milling. It forms, in the dry state, a dark powder soluble in water to a red solution, insoluble in alcohol, ether, benzene and pyridine, and is destroyed by reducing agents.

Other dyes, the tints of which are brown and the chromium lakes of which are bordeaux, having the same qualities as that of example 1, may be obtained by combining 4-nitro-2-diazo-1-oxybenzene-6-sulfonic acid or 4-chloro-2-diazo-1-oxybenzene-5-sulfonic acid with 8-oxyquinoline.

2. 19.9 parts of 4.6-dinitro-2-amino-1-oxybenzene are diazotized in the known manner and united with an alkaline solution of 22.5 parts of 8-oxyquinoline-5-sulfonic acid. The dye is salted out and finished in the usual manner. In the dry state it forms a dark powder soluble in water to a red solution, insoluble in ether, benzene and pyridine. It forms on wool corinth tints becoming more reddish and fast to light and to milling by treatment with bichromate.

The dye which may be obtained by combining 4-nitro-2-diazo-1-oxybenzene-6-sulfonic acid and 8-oxyquinoline-5-sulfonic acid dyes wool brownish violet becoming bordeaux by treatment with chromium compounds.

Having now described my invention and the manner in which it may be performed what I claim is,—

1. The new azo dyes forming in the dry state dark powders being soluble in water, insoluble in alcohol, ether, benzene and pyridine, being destroyed by reducing agents, forming on mordanted wool bordeaux to violet brown chromium lakes and being sulfonic acids of the azo dyes derived from a diazotized aromatic ortho-oxyamino-compound and a monohydroxyderivative of quinoline.

2. The new azo dyes forming in the dry state dark powders being soluble in water, insoluble in alcohol, ether, benzene and pyridine, being destroyed by reducing agents, forming bordeaux to violet chromium lakes and derived from a derivative of an ortho-oxydiazoarylsulfonic acid and a monohydroxy derivative of quinoline, corresponding to the general formula:

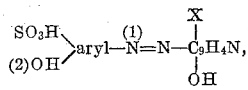

—X meaning an univalent inorganic radical.

3. The new azo dyes forming in the dry state dark powders being soluble in water, insoluble in alcohol, ether, benzene and pyridine, being destroyed by reducing agents, forming bordeaux to violet chromium lakes and derived from a derivative of an ortho-oxydiazoaryl-sulfonic acid and an 8-monohydroxy-derivative of quinoline corresponding to the general formula:

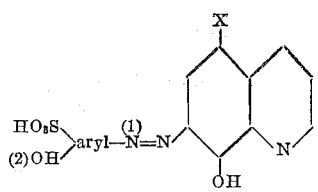

—X meaning an univalent inorganic radical.

4. The new azo-dyes forming in the dry state dark powders being soluble in water, insoluble in alcohol, ether, benzene and pyridine, being destroyed by reducing agents forming bordeaux to violet chromium lakes and derived from a derivative of an ortho-oxydiazoaryl-sulfonic acid of the benzene series and an 8-monohydroxy-derivative of quinoline corresponding to the general formula:

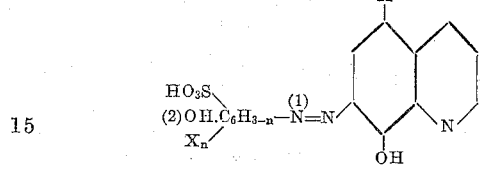

—X meaning univalent inorganic radicals.

5. The new azo-dyes forming in the dry state dark powders, being soluble in water, insoluble in alcohol, ether, benzene and pyridine, being destroyed by reducing agents, forming bordeaux to violet chromium lakes and derived from an ortho-oxynitrodiazobenzene-sulfonic acid and an 8-monohydroxy-derivative of quinoline corresponding to the general formula:

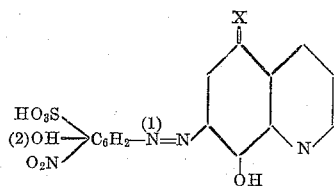

—X meaning an univalent inorganic radical.

6. The new azo-dyes forming in the dry state dark powders being soluble in water, insoluble in alcohol, ether, benzene and pyridine, being destroyed by reducing agents, forming bordeaux to violet chromium lakes and derived from 4-nitro-1-oxy-2-diazo-benzene-6-sulfonic acid and an 8-monohydroxyquinoline-derivative corresponding to the general formula:

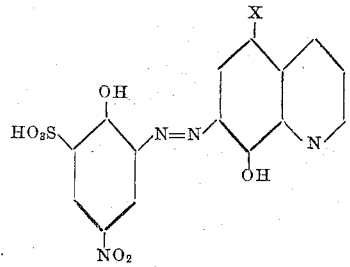

—X meaning an univalent inorganic radical.

7. The new azo dye being in the dry state a dark powder being soluble in water, insoluble in alcohol, ether, benzene and pyridine, being destroyed by reducing agents, forming bordeaux chromium lakes and derived from 4-nitro-1-oxydiazobenzene-6-sulfonic acid and 8-hydroxyquinoline-5-sulfonic acid corresponding to the formula:

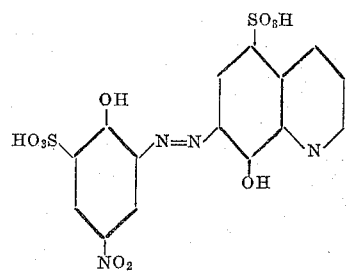

In testimony whereof I affix my signature in presence of two witnesses.

DR. RUDOLF HAUGWITZ.

Witnesses:
OSWALD SCHARFENBERG,
GERHARD HOPPE.